US012324065B2

(12) United States Patent
Liu et al.

(10) Patent No.: US 12,324,065 B2
(45) Date of Patent: Jun. 3, 2025

(54) DIMMING CONTROL CIRCUIT, DIMMING CONTROL METHOD, AND LED DRIVER CIRCUIT

(71) Applicant: Shenzhen Kiwi Instruments Corporation, Shenzhen (CN)

(72) Inventors: Bairen Liu, Shenzhen (CN); Lang Bai, Shenzhen (CN); Feng Cao, Shenzhen (CN); Shuguang Wang, Shenzhen (CN)

(73) Assignee: SHENZHEN KIWI INSTRUMENTS CORPORATION, Shenzen (CN)

( * ) Notice: Subject to any disclaimer, the term of this patent is extended or adjusted under 35 U.S.C. 154(b) by 142 days.

(21) Appl. No.: 18/191,280

(22) Filed: Mar. 28, 2023

(65) Prior Publication Data

US 2023/0309205 A1 Sep. 28, 2023

(30) Foreign Application Priority Data

Mar. 29, 2022 (CN) ......................... 202210314399.5

(51) Int. Cl.
*H05B 45/14* (2020.01)
*H05B 45/46* (2020.01)

(52) U.S. Cl.
CPC ............. *H05B 45/14* (2020.01); *H05B 45/46* (2020.01)

(58) Field of Classification Search
CPC ........ H05B 45/14; H05B 45/46; H05B 45/10; H05B 45/30; H05B 45/325; H05B 45/345;
(Continued)

(56) References Cited

U.S. PATENT DOCUMENTS

| | | | | |
|---|---|---|---|---|
| 8,664,884 B2 * | 3/2014 | Li | .......................... | H05B 45/10 315/307 |
| 9,035,560 B2 * | 5/2015 | Li | .......................... | H05B 45/46 315/210 |

(Continued)

FOREIGN PATENT DOCUMENTS

| | | |
|---|---|---|
| CN | 102595702 A | 7/2012 |
| CN | 113286398 A | 8/2021 |

*Primary Examiner* — Ryan Jager
(74) *Attorney, Agent, or Firm* — MUNCY, GEISSLER, OLDS & LOWE, P.C.

(57) ABSTRACT

The application discloses a dimming control circuit, a dimming control method, and a LED driver circuit. The dimming control circuit comprises a logic signal generation circuit and a feedback signal generation circuit. wherein the logic signal generation circuit is configured to compare the sampling signals with a first threshold signal and a second threshold signal respectively to obtain a first group of logic signals and a second group of logic signals. Wherein the feedback signal generation circuit is coupled to the logic signal generation circuit, which is configured to generate feedback signals to reduce energy output when each of the sampling signals is greater than the first threshold signal, and configured to generate feedback signals to increase the energy output when any one of the sampling signals is smaller than the second threshold signal. A dimming control circuit, a dimming control method, and a LED driver circuit provided by the present application, which can make the front-end circuit provide the adaptive control of the output voltage, so as to match the light voltage from different LED loads, leading the system efficiency highly.

15 Claims, 6 Drawing Sheets

(58) Field of Classification Search
CPC ... H05B 47/105; H05B 47/155; H05B 47/165
USPC .......................................................... 315/294
See application file for complete search history.

(56) References Cited

U.S. PATENT DOCUMENTS

| | | | | |
|---|---|---|---|---|
| 9,420,654 | B2 * | 8/2016 | Lee | H05B 45/10 |
| 2011/0291575 | A1 * | 12/2011 | Shiu | H05B 45/35<br>315/192 |
| 2012/0013267 | A1 * | 1/2012 | Yoshio | H05B 45/38<br>315/297 |
| 2012/0176048 | A1 * | 7/2012 | Li | H05B 45/38<br>315/186 |
| 2012/0176050 | A1 * | 7/2012 | Li | H05B 45/46<br>315/192 |
| 2014/0333217 | A1 * | 11/2014 | Lee | H05B 45/10<br>315/187 |
| 2015/0189706 | A1 * | 7/2015 | Yang | H05B 45/46<br>315/224 |
| 2021/0120642 | A1 * | 4/2021 | Zhang | H05B 45/30 |
| 2023/0309205 | A1 * | 9/2023 | Liu | H05B 45/14 |

* cited by examiner

DIMMING CONTROL CIRCUIT, DIMMING CONTROL METHOD, AND LED DRIVER CIRCUIT

CROSS-REFERENCE TO RELATED APPLICATIONS

This application claims priority to and the benefit of Chinese Patent Applications No. 202210314399.5, filed on Mar. 29, 2022, which are incorporated herein by reference in its entirety.

TECHNICAL FIELD

This application relates to the power electronics technical field, to a LED driving technology, and in particular, to a dimming control circuit, a dimming control method, and a LED driver circuit.

BACKGROUND

LED lights are widely used in the field of lighting due to their many advantages such as energy saving, environmental protection, and good color rendering. In a specific circuit application, a stable current is provided to the LED lights through the LED driving circuit to drive the LED lights to work normally. In practical applications, it is usually necessary to use two or more branches of LED loads to realize the functions of dimming and color matching. For example, in the existing five branches of RGBCW LEDs driving solution, due to the light voltage deviation between RGB lights and CW lights, it is necessary to adopt a way of driving the RGB lights and the CW lights separately. Among them, for the RGB lights, a front-end circuit provides an output voltage to the RGB lights through constant voltage output control, and a back-end circuit uses linear chopping dimming to realize dimming control. For the CW lights, the front-end circuit provides constant current dimming control on the CW lights, and the back-end circuit controls the color temperature adjustment. Circuit structure of the above-mentioned LED driving circuit is relatively complex, the RGB lights and the CW lights need be driven separately, and both the RGB lights and the CW lights need be driven in two stages. In addition, system efficiency of the LED driving circuit is relatively low, this is because there is a deviation range between three branches of light voltages of the RGB lights, input voltage of the RGB lights must be designed according to the highest light voltage among three branches of light voltages, which leads to the fact that in most light voltage situations, the linear constant current part needs to bear a large pressure difference, resulting in relatively low system efficiency.

In view of this, it is necessary to provide a new structure or control method for solving at least some of the above problems.

SUMMARY

In view of one or more problems in the prior art, a dimming control circuit, a dimming control method, and a LED driver circuit is provided in the present application.

An embodiment of the present application discloses a dimming control circuit, for driving multiple branches of light sources, the multiple branches of light sources comprising at least two branches of LED loads, the dimming control circuit comprising:

a logic signal generation circuit, having input terminals respectively coupled to each branch of LED loads to obtain each branch of sampling signals, configured to compare the sampling signals with a first threshold signal respectively to obtain a first group of logic signals, and configured to compare the sampling signals with a second threshold signal respectively to obtain a second group of logic signals; wherein the first threshold signal is greater than the second threshold signal; and a feedback signal generation circuit, having an input terminal coupled to an output terminal of the logic signal generation circuit, configured to generate feedback signals to reduce energy output by a front-end circuit when the first group of logic signals are characterized that each of the sampling signals is greater than the first threshold signal, and configured to generate feedback signals to increase the energy output by the front-end circuit when the second group of logic signals are characterized that any one of the sampling signals is smaller than the second threshold signal.

Another embodiment of the present application discloses a LED driver circuit, comprising a front-end circuit and the dimming control circuit as described above, the front-end circuit comprising a voltage conversion circuit, and the voltage conversion circuit configured to convert an input voltage to a voltage suitable for each of LED loads.

Yet another embodiment of the present application discloses a dimming control method for driving multiple branches of light sources, the multiple branches of light sources comprising at least two branches of LED loads, the dimming control method comprising:

obtaining each branch of sampling signals corresponding to each branch of LED loads, comparing the sampling signals with a first threshold signal respectively to obtain a first group of logic signals, and comparing the sampling signals with a second threshold signal respectively to obtain a second group of logic signals; wherein the first threshold signal is greater than the second threshold signal; and when the first group of logic signals is characterized in that each of the sampling signals is greater than the first threshold signal, generating feedback signals to reduce energy output of the front-end circuit, and when the second group of logic signals is characterized that any one of the sampling signals is smaller than the second threshold signal, generating feedback signals to increase the energy output of the front-end circuit.

BRIEF DESCRIPTION OF THE DRAWINGS

The above aspects and implementation forms of the present application will be explained in the following description of specific embodiments in relation to the enclosed drawings, in which.

DETAILED DESCRIPTION

In order to further understand the present application, the following describes the preferred implementation scheme of the application in combination with embodiments, but it should be understood that these descriptions only for further illustrate the features and advantages of the present application, rather than limit the claims of the present application.

The descriptions in this section is only for a few typical embodiments, and the present application is not limited to the scope of the description of the embodiments. Combinations of different embodiments, replacement of some technical features in different embodiments, and replacement of same or similar prior art means with some technical features in the embodiments are also within the scope of description and protection of the present application.

"Coupling" or "connection" in the specification includes both direct connection and indirect connection. Indirect connection is a connection through an intermediate medium, such as a connection through an electrically conductive medium such as a conductor, wherein the electrically conductive medium may contain parasitic inductance or parasitic capacitance, and may also be connected through an intermediate circuit or component described in the embodiments in the specification; indirect connections may also include connections through other active or passive devices on the basis of which the same or similar functions can be achieved, such as connections through switches, signal amplifiers, follower circuits and other circuits or components. "Multiple" or "many" means two or more. In addition, in the present application, terms such as first and second are used primarily to distinguish one technical feature from another and do not necessarily require or imply an actual relationship or sequence between these technical features.

Figure 1:
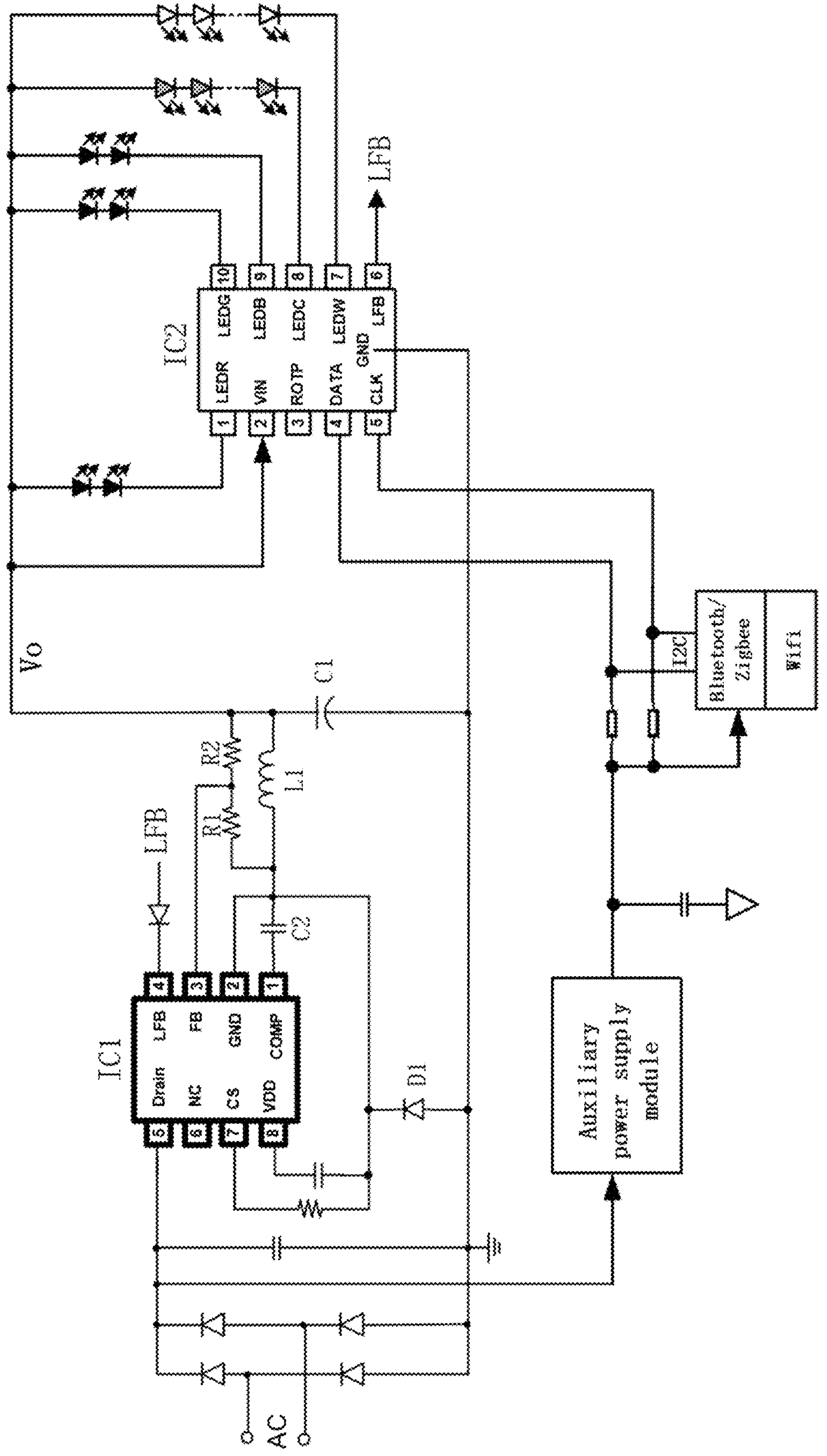
FIG. 1 shows a schematic diagram of a circuit structure of a LED driving circuit according to an embodiment of the present application.

An embodiment of the present application is disclosed a LED driving circuit, as shown in FIG. 1, the LED driving circuit comprises a front-end circuit and a dimming control circuit. The front-end circuit comprises a voltage conversion circuit, wherein the voltage conversion circuit is configured to convert an input voltage to a voltage suitable for each branch of LED loads. In a specific embodiment, the voltage conversion circuit comprises one of a Buck switch circuit, a Boost switch circuit, a Buck-Boost switch circuit, a flyback switch circuit and so on. As shown in FIG. 1, the voltage conversion circuit is a Buck switch circuit, and the Buck switch circuit comprises a first switch tube (not shown in the FIG. 1), a first inductor L1, a first capacitor C1, and a first diode D1. A first terminal of the first switch tube is coupled to the input voltage, a first terminal of the first inductor L1 is coupled to a second terminal of the first switch tube, and a first terminal of the first capacitor C1 is coupled to a second terminal of the first inductor L1, an anode of the first diode D1 is coupled to a second terminal of the first capacitor C1, and a cathode of the first diode D1 is coupled to the first terminal of the first inductor L1. The first capacitor C1 provides the output voltage Vo to each branch of LED loads. The above Buck switch circuit can be replaced with other topology circuits according to the needs of specific circuit applications.

In an embodiment as shown in FIG. 1, multiple branches of light sources are multiple branches of LED loads. The multiple branches of LED loads comprise RGB lights (i.e. red, green, blue) and CW lights (i.e. cool white, warm white). The RGB lights and the CW lights are respectively coupled to the voltage conversion circuit to obtain the output voltage Vo. Input terminals of the dimming control circuit are configured to respectively be coupled to the each branch of LED loads (i.e. RGB lights and CW lights). The dimming control circuit comprises a logic signal generation circuit and a feedback signal generation circuit. Input terminals of the logic signal generation circuit are respectively coupled to each branch of LED loads to obtain each branch of sampling signals. Each branch of the sampling signals can respectively correspond to terminal voltages of each branch of the LED loads. Specifically, a sampling signal LEDR represents a terminal voltage of the R light, a sampling signal LEDG represents a terminal voltage of the G light, a sampling signal LEDB represents a terminal voltage of the B light, a sampling signal LEDC represents a terminal voltage of the C light, and a sampling signal LEDW represents a terminal voltage of the W light. The logic signal generation circuit is configured to compare the sampling signals with a first threshold signal to obtain a comparison result, and obtains a first group of logic signals according to the comparison result. The logic signal generation circuit is further configured to compare the sampling signals with a second threshold signal to obtain a second group of logic signals. Wherein, the first threshold signal is greater than the second threshold signal. An input terminal of the feedback signal generation circuit is coupled to an output terminal of the logic signal generation circuit, an output terminal for the feedback signals of the feedback signal generation circuit is coupled to an input terminal for the feedback signals of the logic signal generation circuit, and the output terminal of the feedback signal generation circuit outputs a feedback signal LFB. Specifically, the feedback signal generation circuit is configured to generate feedback signals to reduce energy output by the front-end circuit when the first group of logic signals are characterized that each of the sampling signals is greater than the first threshold signal, and configured to generate feedback signals to increase the energy output by the front-end circuit when the second group of logic signals are characterized that any one of the sampling signals is smaller than the second threshold signal.

In an embodiment of the present application, the LED driving circuit further comprises a dimming module, and the dimming module performs dimming control on the RGB lights and the CW lights according to a control signal obtained from the communication module. The communication module comprises at least one of communication modules such as a Bluetooth module, a Zigbee module, and a Wifi module. In the embodiment shown in FIG. 1, the communication module sends an I2C signal to the dimming module, and the dimming module performs dimming control on the RGB lights and the CW lights according to the I2C signal. Preferably, the dimming module is powered by a driving voltage Vbus or an auxiliary power supply module.

In an embodiment of the present application, the dimming control circuit is configured to drive multiple branches of light sources, and the dimming control circuit comprises the logic signal generation circuit 10 and the feedback signal generation circuit 20. In an embodiment, the multiple branches of light sources comprise two branches of LED loads, which are LED load A and LED load B respectively. Input terminals of the logic signal generation circuit 10 are respectively coupled to LED load A and LED load B. The logic signal generation circuit 10 obtains a sampling signal LEDA representing a terminal voltage of LED load A and obtains a sampling signal LEDB representing a terminal voltage of LED load B. The logic signal generation circuit 10 is configured to compare the sampling signal LEDA with a first threshold signal LEDminH to obtain a comparison result H_A, and the logic signal generation circuit 10 is also configured to compare the sampling signal LEDB with the first threshold signal LEDminH to obtain a comparison result H_B, thereby obtaining a first group of logic signals H_A and H_B. The first group of logic signals are a set of comparison results obtained by comparing the sampling signals with the first threshold signal respectively. The logic signal generation circuit 10 is further configured to compare the sampling signal LEDA with a second threshold signal LEDminL to obtain a comparison result L_A, and the logic signal generation circuit 10 is also configured to compare the sampling signal LEDB with the second threshold signal LEDminL to obtain a comparison result L_B, thereby obtaining a second group of logic signals L_A and L_B. The second group of logic signals are a set of comparison results obtained by comparing the sampling signals with the second threshold signal respectively. Wherein, the first threshold signal LEDminH is greater than the second threshold signal LEDminL.

In an embodiment of the present application, the input terminal of the feedback signal generation circuit 20 is coupled to the output terminal of the logic signal generation circuit 10, and the feedback signal generation circuit 20 is configured to generate a feedback signal LFB to reduce energy output by the front-end circuit when the first group of logic signals H_A and H_B are characterized that each of the sampling signals is greater than the first threshold signal, and configured to generate the feedback signal LFB to increase the energy output by the front-end circuit when the second group of logic signals L_A and L_B are characterized that any one of the sampling signals is smaller than the second threshold signal.

In another embodiment of the present application, the multiple branches of light sources comprise five branches of LED loads, which respectively are red light (such as the R light), green light (such as the G light), blue light (such as the B light), cool white light (such as the C light) and warm white light (such as the W light). The dimming control circuit is configured to drive the five branches of LED loads, and the dimming control circuit comprises the logic signal generation circuit 10 and the feedback signal generation circuit 20. The input terminals of the logic signal generation circuit 10 is configured to respectively be coupled each branch of LED loads to obtain each branch of sampling signals, and each branch of the sampling signals comprises the sampling signal LEDR, the sampling signal LEDG, the sampling signal LEDB, the sampling signal LEDC and the sampling signal LEDW. The logic signal generation circuit 10 is configured to compare the sampling signals with the first threshold signal LEDminH to obtain a group of comparison result signals, which are the first group of logic signals H_R, H_G, H_B, H_C, H_W. The logic signal generation circuit 10 is further configured to compare the sampling signals with the second threshold signal LEDminL to obtain another set of comparison result signals, which are the second group of logic signals L_R, L_G, L_B, L_C, L_W. Wherein, the first threshold signal LEDminH is greater than the second threshold signal LEDminL.

Figure 2:
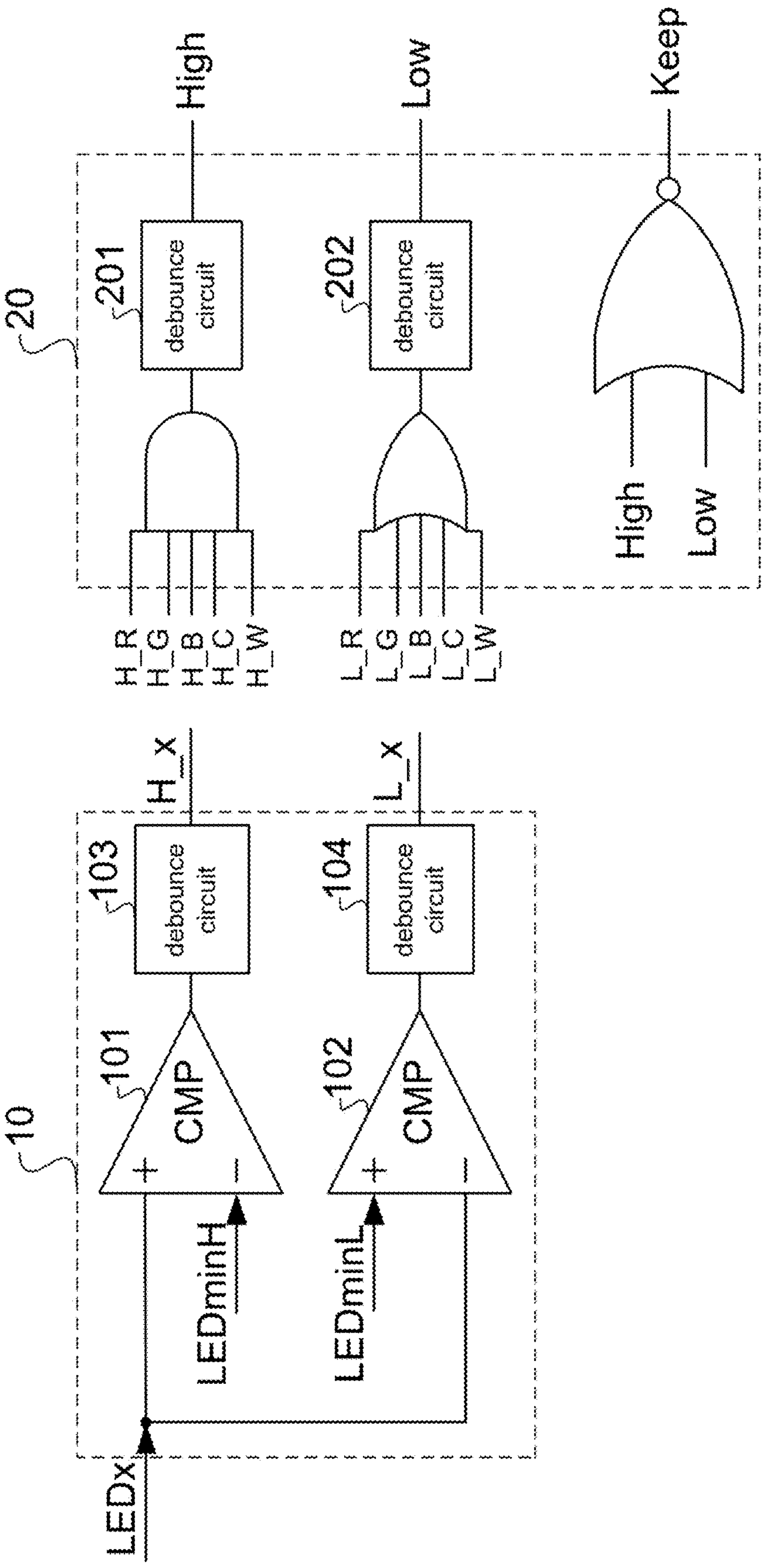
FIG. 2 shows a schematic diagram of a circuit structure of a dimming control circuit according to an embodiment of the present application.

In an embodiment of the present application, as shown in FIG. 2, for five branches of light sources, the logic signal generation circuit 10 comprises a first branch of comparison circuit, a second branch of comparison circuit, a third branch of comparison circuit, a fourth branch of comparison circuit, and a fifth branch of comparison circuit. In a specific embodiment, the first branch of comparison circuit obtains the sampling signal LEDR corresponding to first branch of LED loads (such as the R lights), and the second branch of comparison circuit obtains the sampling signal LEDG corresponding to second branch of LED loads (such as the G lights), the third branch of comparison circuit obtains the sampling signal LEDB corresponding to third branch of LED loads (such as the B lights), the fourth branch of comparison circuit obtains the sampling signal LEDC corresponding to fourth branch of LED loads (such as the C lights), and the fifth branch of comparison circuit obtains the sampling signal LEDW corresponding to fifth branch of LED loads (such as the W lights). A corresponding number of comparison circuits can be set according to the number of multiple branches of light sources.

In one embodiment, as shown in FIG. 2, the first branch of comparison circuit comprises a first-one comparison circuit 101 and a first-two comparison circuit 102. A first terminal of the first-one circuit 101 is coupled to the first branch of LED loads to obtain the sampling signal LEDR, and a second terminal of the first-one comparison circuit 101 is coupled to the first threshold signal LEDminH, and an output terminal of the first-one comparison circuit 101 outputs a comparison result H_R. A first terminal of the first-two comparison circuit 102 is coupled to the second threshold signal LEDminL, a second terminal of the first-two comparison circuit is coupled to the first branch of LED loads to obtain the sampling signal LEDR, and an output terminal of the first-two comparison circuit 102 outputs a comparison result L_R. The second branch of comparison circuit comprises a second-one comparison circuit and a second-two comparison circuit. A first terminal of the second-one circuit is coupled to the second branch of LED loads to obtain the sampling signal LEDG, and a second terminal of the second-one comparison circuit is coupled to the first threshold signal LEDminH, and an output terminal of the second-one comparison circuit outputs a comparison result H_G. A first terminal of the second-two comparison circuit is coupled to the second threshold signal LEDminL, a second terminals of the second-two comparison circuit is coupled to the second branch of LED loads to obtain the sampling signal LEDG, and an output terminal of the second-two comparison circuit outputs a comparison result L_G. Remaining three branches of the comparison circuits can be deduced by analogy, so as to obtain the first group of logic signals H_R, H_G, H_B, H_C, H_W and the second group of logic signals L_R, L_G, L_B, L_C, L_W.

In one embodiment, as shown in FIG. 2, the first branch of comparison circuit further comprises a first-one debounce circuit 103 and a first-two debounce circuit 104. Wherein an input terminal of the first-one debounce circuit 103 is coupled to the output terminal of the first-one comparison circuit 101, and an input terminal of the first-two debounce circuit 104 is coupled to the output terminal of the first-two comparison circuit 102; the second branch of comparison circuit further comprises a second-one debounce circuit and a second-two debounce circuit. Wherein an input terminal of the second-one debounce circuit is coupled to the output terminal of the second-one comparison circuit, and an input terminal of the first-two debounce circuit is coupled to the output terminal of the second-two comparison circuit. In the dimming control circuit corresponding to the five branches of light sources, preferably, each comparison circuit is respectively coupled after a debounce circuit, which can eliminate or reduce the influence of noise.

In one embodiment, an input terminal of the feedback signal generation circuit 20 is coupled to the output terminal of the logic signal generation circuit 10, and the feedback signal generation circuit 20 is configured to generate feedback signals to reduce energy output by the front-end circuit when the first group of logic signals H_R, H_G, H_B, H_C, H_W characterized that each of the sampling signals is greater than the first threshold signal. The feedback signal generation circuit 20 is further configured to generate feedback signals to increase the energy output by the front-end circuit when the second group of logic signals L_R, L_G, L_B, L_C and L_W is characterized that any one of the sampling signals is smaller than the second threshold signal. The front-end circuit performs energy output control according to the feedback signals. In another embodiment of the present application, the feedback signals comprise a first combination signal, a second combination signal and a third combination signal. The first combination signal, the second combination signal and the third combination signal are obtained respectively according to the sampling signals and through logical operations. The first combination signal is configured to control the front-end circuit to reduce the energy output, the second combination signal is configured to control the front-end circuit to increase the energy output, and the third combination signal is configured to control the front-end circuit to maintain the energy output at a current state. Logic control priority of the feedback signals is from high to low: the second combination signal, the third combination signal, and the first combination signal. The first combination signal is obtained through an and gate, so logic control having a lower priority.

In another embodiment of the present application, as shown in FIG. 2, the feedback signal generation circuit 20 comprises a first AND gate, a first OR gate, and a first NOR gate. Input terminals of the first AND gate are respectively coupled to each of the first group of logic signals. As shown in FIG. 2, a first input terminal of the first AND gate is coupled to a signal H_R, a second input terminal of the first AND gate is coupled to a signal H_G, a third input terminal of the first AND gate is coupled to a signal H_B, and a fourth input terminal of the first AND gate is coupled to a signal H_C, a fifth input terminal of the first AND gate is coupled to a signal H_W, and an output terminal of the first AND gate outputs the first combination signal. Exemplarily, when the first combination signal is at a first level (such as a high level), the energy output of the front-end circuit is reduced according to the feedback signals. Input terminals of the first OR gate are respectively coupled to each of the second group of logic signals. As shown in FIG. 2, a first input terminal of the first OR gate is coupled to a signal L_R, a second input terminal of the first OR gate is coupled to a signal L_G, a third input terminal of the first OR gate is coupled to a signal L_B, and a first The fourth input terminal of the or gate is coupled to a signal L_C, a fifth input terminal of the first OR gate is coupled to a signal L_W, and an output terminal of the first OR gate outputs the second combination signal. Exemplarily, when the second combination signal is at a first level (such as a high level), the energy output of the front-end circuit is boosted according to the feedback signals. A first input terminal of the first NOR gate is coupled to the first combination signal High, a second input terminal of the first NOR gate is coupled to the second combination signal Low, and an output terminal of the first NOR gate outputs the third combination signal Keep. Exemplarily, when neither the first combination signal nor the second combination signal is at the first level, the current energy output is maintained according to the feedback signal.

In yet another embodiment of the present application, as shown in FIG. 2, an output terminal of the first AND gate is coupled to the input terminal of the first debounce circuit 201, and an output terminal of the first OR gate is coupled to the input terminal of the second debounce circuit 202. The output terminal of the first debounce circuit 201 outputs the first combination signal High, the output terminal of the second debounce circuit 202 outputs the second combination signal Low, and the output terminal of the first NOR gate outputs the third combination signal Keep.

In an embodiment of the present application, the logic signal generation circuit 11 is further configured to compare the sampling signals with a third threshold signal to obtain a third group of logic signals, and the third group of logic signals is the overvoltage threshold signal of an output voltage of the front-end circuit. For the voltage threshold signal, the minimum value among the overvoltage thresholds of each of LED loads can be selected as the third threshold signal, and the third threshold signal is greater than the first threshold signal. The third group of logic signals is a set of comparison results obtained by comparing the sampling signals with the third threshold signal respectively. When any one of the sampling signals is greater than the third threshold signal, the feedback signal generation circuit 21 generates the feedback signals to control the front-end circuit to limit the energy output, thereby realizing the overvoltage protection control of the LED driving circuit. The process of controlling the front-end circuit to limit the energy output may specifically be that the front-end circuit stops the switching action of the first switch tube in the front-end circuit according to the feedback signals, and the energy output of the front-end circuit can be controlled by controlling the switching action of the first switch tube. It is also possible to control the energy output of the front-end circuit to be below a safe value.

Figure 3:
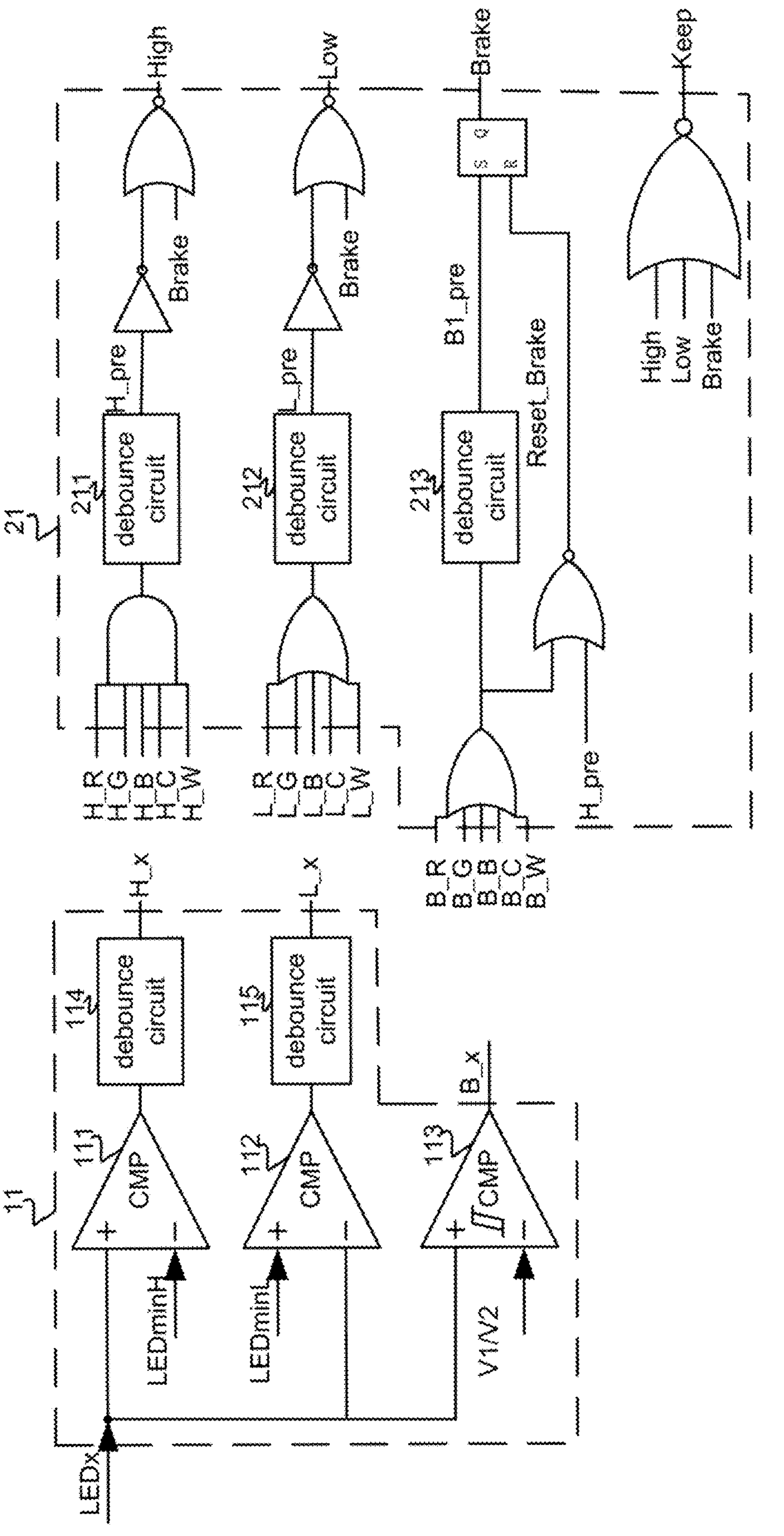
FIG. 3 shows a schematic diagram of a circuit structure of a dimming control circuit according to another embodiment of the present application.

In another embodiment of the present application, as shown in FIG. 3, for the five branches of light sources, the logic signal generation circuit 11 comprises the first branch of comparison circuit, the second branch of comparison circuit, the third branch of comparison circuit, the fourth branch of comparison circuit and the fifth branch of comparison circuit. The first branch of comparison circuit is selected as R lights as an example, and the remaining four branches of the comparison circuit can be set by reference. The first branch of comparison circuit comprises a first-one comparison circuit 111, a first-two comparison circuit 112 and a first-there comparison circuit 113. Specifically, the first-one comparison circuit 111 comprises a first-one comparator, wherein a non-inverting input terminal of the first-one comparator is coupled to the first branch of LED loads (such as the R lights), and an inverting input terminal of the first-one comparator is coupled to the first threshold signal LEDminH. The first-two comparison circuit 112 comprises first-two comparator, wherein a non-inverting input terminal of the first-two comparator are coupled to the second threshold signal LEDminL, and an inverting input terminal of the first-two comparator are coupled to the first branch of LED loads (such as the R lights). The first-three comparison circuit 113 comprises a first-three hysteresis comparator, wherein a non-inverting input terminal of the first-three hysteresis comparator is coupled to the first branch of LED loads (such as the R lights), and an inverting input terminal of the first three hysteresis comparator is coupled to the third threshold signal, and an output terminal of the first-three hysteresis comparator outputs a comparison result signal B_R. The upper threshold voltage of the first-three hysteresis comparator is the voltage V1, and the lower threshold voltage of the first-three hysteresis comparator is the voltage V2, wherein the voltage V1 is greater than the voltage V2.

In one embodiment, the five branches of light sources comprise RGB lights and CW lights, and the logic signal generation circuit 11 generates comparison result signals of B_R, B_G, B_B, B_C and B_W.

In an embodiment of the present application, as shown in FIG. 3, the feedback signal generation circuit 21 comprises a first AND gate, a first NOT gate, a second NOR gate, a first OR gate, a second NOT gate, a third NOR gate, a second OR gate, a fourth NOR gate, a flip-flop circuit and a first NOR gate. Input terminals of the first AND gate are respectively coupled to each signals H_R, H_G, H_B, H_C and H_W of the first group of logic signals. An input terminal of the first NOT gate is coupled to an output terminal of the first AND gate. A first input terminal of the second NOR gate is coupled to an output terminal of the first NOR gate, and a second input terminal of the second NOR gate is coupled to the fourth combination signal, and an output terminal of the second NOR gate outputs the first combination signal High. Input terminals of the first OR gate are respectively coupled to signals L_R, L_G, L_B, L_C and L_W of the second group of logic signals. An input terminal of the second NOT gate is coupled to an output terminal of the first OR gate. A first input terminal of the third NOR gate is coupled to an output terminal of the second NOR gate, and a second input terminal of the third NOR gate is coupled to the fourth combination signal, and an output terminal of the third NOR gate outputs the second combination signal Low. Input terminals of the second OR gate are respectively coupled to signals B_R, B_G, B_B, B_C and B_W of the third group of logic signals. A first input terminal of the fourth NOR gate is coupled to an output terminal of the second OR gate, and a second input terminal of the fourth NOR gate is coupled to the output terminal of the first AND gate. The set terminal of the flip-flop circuit is coupled to an output terminal of the second OR gate, and the reset terminal of the flip-flop circuit is coupled to an output terminal of the fourth NOR gate, and an output terminal of the flip-flop circuit outputs the fourth combination signal Brake. A first input of the first NOR gate is coupled to the first combination signal High, and a second input of the first NOR gate is coupled to the second combination signal Low, and a third input of the first NOR gate is coupled to the fourth combination signal Brake, and an output terminal of the first NOR gate outputs the third combination signal Keep. In a preferred embodiment, the first debounce circuit 211 is further coupled between the first AND gate and the first NOT gate. The second debounce circuit 212 is coupled between the first OR gate and the second NOT gate. The third debounce circuit 213 is coupled between the second OR gate and the flip-flop circuit, and an input terminal of the third debounce circuit 213 is coupled to the output terminal of the second OR gate, and an output terminal of the third debounce circuit 213 is coupled to the set terminal of the flip-flop circuit.

In an embodiment of the present application, the feedback signals comprise a first combination signal, a second combination signal, a third combination signal and a fourth combination signal. The fourth combination signal is configured to control the front-end circuit to limit energy output. The logic control priority of the feedback signals from high to low is: the fourth combination signal, the second combination signal, the third combination signal and the first combination signal.

In another embodiment of the present application, the logic signal generation circuit 11 is further configured to compare the sampling signals with a fourth threshold signal respectively to obtain a fourth group of logic signals, and the fourth threshold signal is smaller than the second threshold signal. The fourth group of logic signals are a set of comparison results obtained by comparing the sampling signals with the fourth threshold signal respectively. When any one of the sampling signals is smaller than the fourth threshold signal, the feedback signal generation circuit 21 generates the feedback signals to control the front-end circuit to limit the energy output, thereby realizing the open-circuit protection function of the LED driving circuit and improving the stability of the system.

Figure 4:
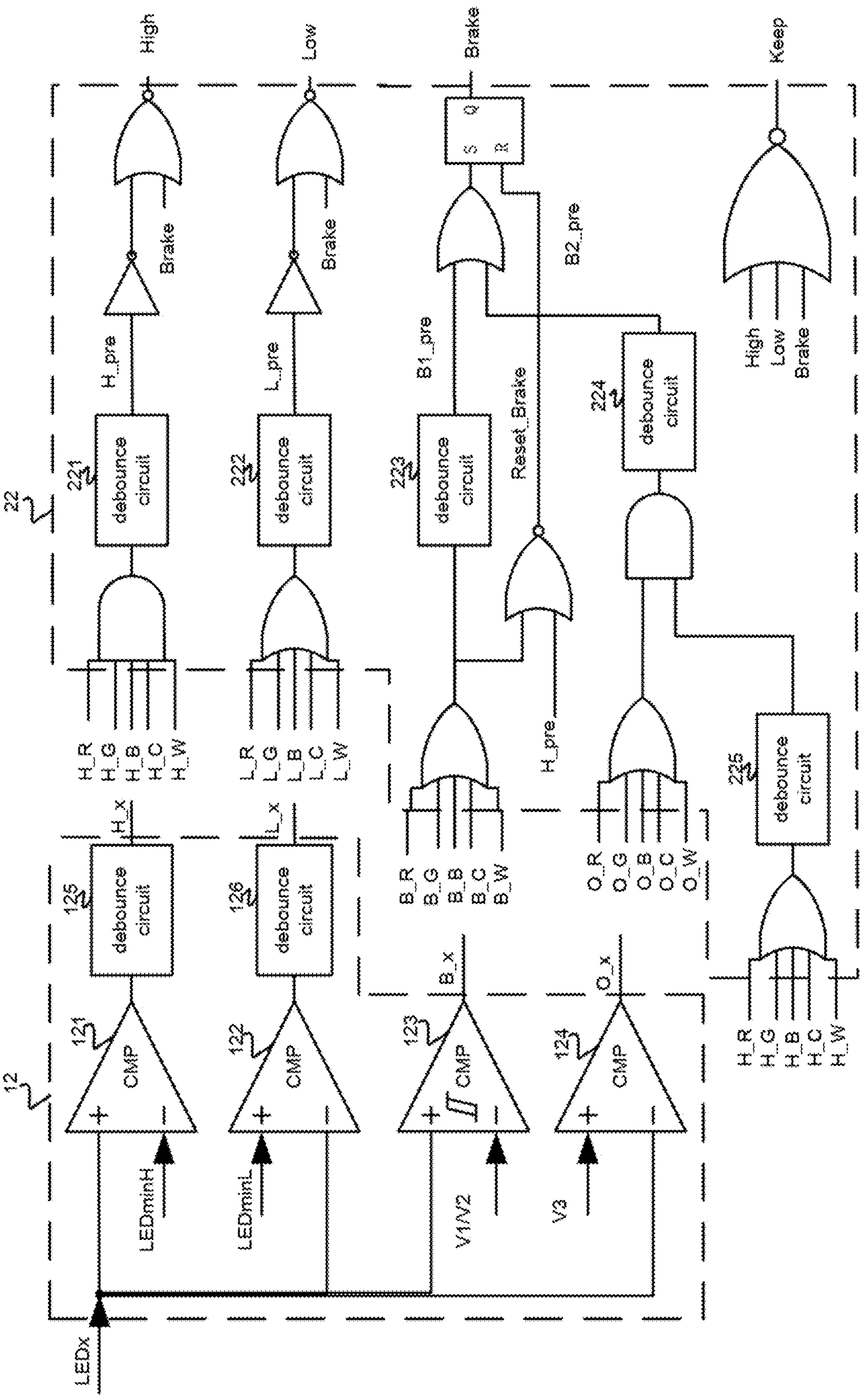
FIG. 4 shows a schematic diagram of a circuit structure of a dimming control circuit according to yet another embodiment of the present application.

In yet another embodiment of the present application, for the five branches of light sources, the logic signal generation circuit 12 comprises a first branch of comparison circuit, a second branch of comparison circuit, a third branch of comparison circuit, a fourth branch of comparison circuit and a fifth branch of comparison circuit. The first branch of comparison circuit is selected as R lights as an example, and the remaining four branches can be set by reference. As shown in FIG. 4, the first branch of comparison circuit comprises a first-one comparison circuit 121, a first-two comparison circuit 122, a first-there comparison circuit 123, and a first-four comparison circuit 124. The circuit arrangement of the first-one comparison circuit 121, the first-two comparison circuit 122, and the first-there comparison circuit 123 may refer to the embodiment of FIG. 3. The first-four comparison circuit 124 comprises a first-four comparator, a non-inverting input terminal of the first four comparator is coupled to the fourth threshold signal V3, and an inverting input terminal of the first-four comparator is coupled to each branch of the LED loads (such as the R lights). The logic signal generation circuit 12 generates comparison result signals of O_R, O_G, O_B, O_C, and O_W based on the fourth threshold signal.

In the embodiment shown in FIG. 4, compared with the embodiment in FIG. 3, the logic signal generation circuit 12 in this embodiment further comprises a third or gate, a fourth or gate, a fifth or gate and a second and gate. Input terminals of the fourth or gate are respectively coupled to the comparison result signals O_R, O_G, O_B, O_C and O_W of the fourth group of logic signals. Input terminals of the fifth or gate are respectively coupled to the comparison result signals H_R, H_G, H_B, H_C, and H_W of the first group of logic signals. A first input terminal of the second and gate is coupled to an output terminal of the fourth or gate, and a second input terminal of the second and gate is coupled to an output terminal of the fifth or gate. A first input terminal of the third or gate is coupled to an output terminal of the second OR gate, the second input terminal of the third or gate is coupled to an output terminal of the second and gate, and an output terminal of the third or gate is coupled to the set terminal of the flip-flop circuit. As a preferred embodiment, the output terminal of the first AND gate is coupled to the first debounce circuit 221. The output terminal of the first OR gate is coupled to the second debounce circuit 222. The output terminal of the second OR gate is coupled to the third debounce circuit 223. The output terminal of the second and gate is coupled to the fourth debounce circuit 224. The output terminal of the fifth or gate is coupled to the fifth debounce circuit 225.

In an embodiment of the present application, the dimming control circuit is configured to drive five branches of LED loads, and the five branches of LED loads comprise RGB lights and CW lights. In the embodiment shown in FIG. 5, the RGB lights are dimming controlled in a pulse width modulation dimming manner, and the CW lights are dimming controlled in an analog dimming manner. When the pulse width modulation signal (such as PWM signal) is at first state, the logic signal generation circuit obtains the sampling signal LEDR, the sampling signal LEDG and the sampling signal LEDB of the RGB light respectively, and the first state is that the pulse width modulation signal is at an active state (such as high level). The logic signal generation circuit acquires each of the sampling signals of the CW lights at a real time. The logic signal generation circuit compares each of the sampling signals of the LED loads with the first threshold signal LEDminH to obtain a first group of logic signals. The logic signal generation circuit compares the sampling signals of the five branches of LED loads with the second threshold signal LEDminL to obtain a second group of logic signals.

Figure 5:
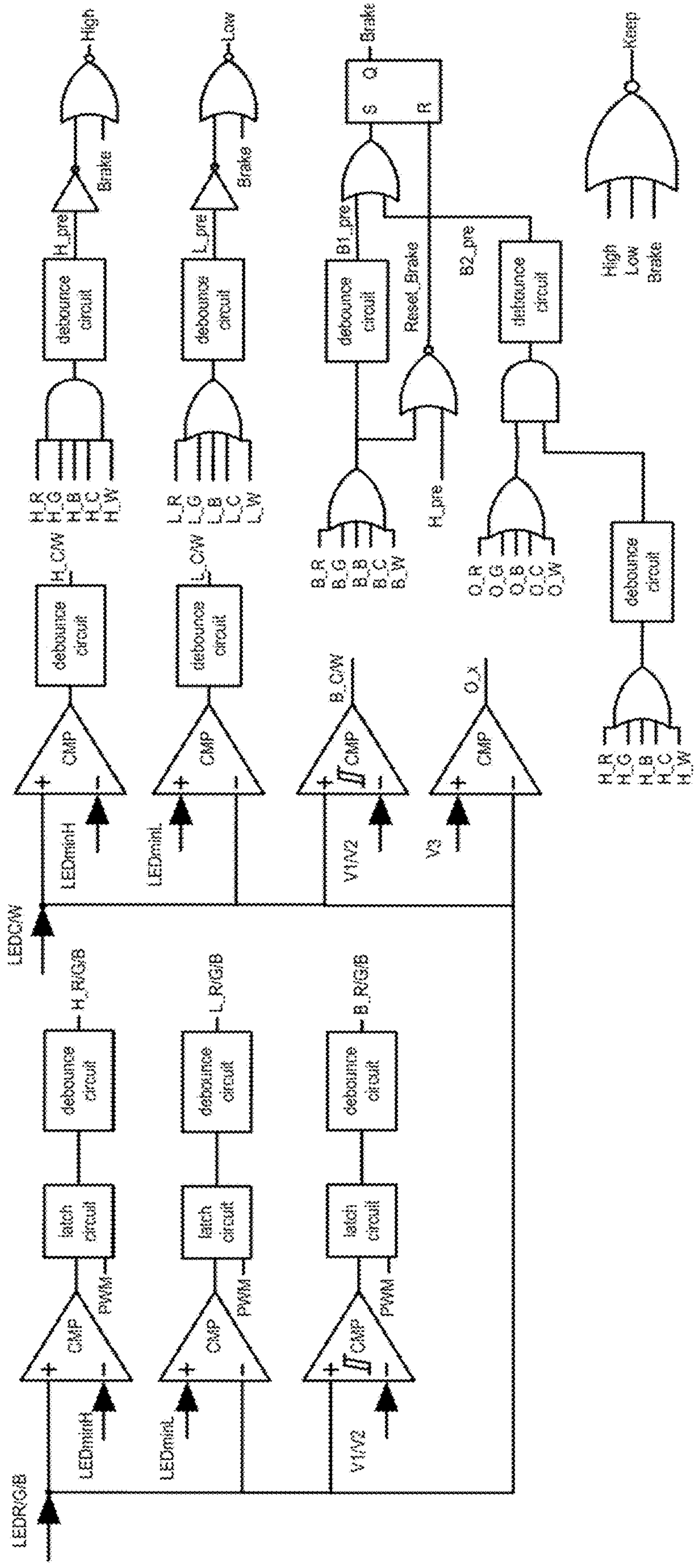
FIG. 5 shows a schematic diagram of a circuit structure of a dimming control circuit according to an embodiment of the present application.

In another embodiment, as shown in FIG. 5, the dimming control circuit is configured to drive five branches of LED loads, and the dimming control circuit comprises a logic signal generation circuit and a feedback signal generation circuit. The logic signal generation circuit comprises a first branch of comparison circuit, a branch of second comparison circuit, a third branch of comparison circuit, a branch of fourth comparison circuit and a fifth branch of comparison circuit. The first branch of comparison circuit is coupled to first branch of LED loads, and the first branch of comparison circuit comprises a first comparison circuit, a first second comparison circuit, a first third comparison circuit, a first latch circuit, a second latch circuit and a third latch circuit. Selecting the first branch of LED loads as R lights as an example, the first input terminal of the first-one comparison circuit is coupled to the first branch of LED loads to obtain the sampling signal LEDR, and the second input terminal of the first-one comparison circuit is coupled to the first threshold signal LEDminH. A first input terminal of the first latch circuit is coupled to the output terminal of the first-one comparison circuit, and a second input terminal of the first latch circuit is coupled to the PWM signal. The first latch circuit is configured to output current feedback logic when the PWM signal is at a first level (such as high level); the first latch circuit is further configured to keep current feedback logic when the PWM signal is at a second level (such as low level). The first input terminal of the first-two comparison circuit is coupled to the second threshold signal LEDminL, and the second input terminal of the first branch of comparison circuit is coupled to the first branch of LED loads to obtain the sampling signal LEDR. A first input terminal of the second latch circuit is coupled to the output terminal of the first-two comparison circuit, and a second input terminal of the second latch circuit is coupled to the PWM signal. The second latch circuit is configured to output current feedback logic when the PWM signal is at a first level (such as high level); the second latch circuit is further configured to keep current feedback logic when the PWM signal is at a second level (such as low level). The first input terminal of the first-three comparison circuit is coupled to the first branch of LED loads to obtain the sampling signal LEDR, and the second input terminal of the first-three comparison circuit is coupled to the third threshold signal. A first input terminal of the third latch circuit is coupled to the output terminal of the first-three comparison circuit, and a second input terminal of the third latch circuit is coupled to the PWM signal. The third latch circuit is configured to output current feedback logic when the PWM signal is at a first level (such as high level); the third latch circuit is further configured to keep current feedback logic when the PWM signal is at a second level (such as low level). For the circuit settings of the second branch of comparison circuit and the branch of third comparison circuit, reference may be made to the first branch of comparison branch circuit, and details are not repeated here. As shown in FIG. 5, the settings of the branch of fourth comparison circuit and the branch of fifth comparison circuit are similar to those embodiments of FIG. 3 and FIG. 4. In addition, in this embodiment, the circuit arrangement of the feedback signal generation circuit is also similar to that of the embodiments in FIG. 3 and FIG. 4, and details are not repeated here.

An embodiment of the present application is disclosed an LED driving circuit, the LED driving circuit comprises a front-end circuit and the dimming control circuit described in any of the above, wherein the front-end circuit comprises a voltage conversion circuit, and the voltage conversion circuit is configured to convert an input voltage to a voltage suitable for each branch of LED loads.

In an embodiment of the present application, the LED driving circuit comprises a front-end circuit and a dimming control circuit, wherein the front-end circuit comprises a voltage conversion circuit, and the voltage conversion circuit is configured to convert an input voltage to a voltage suitable for each branch of LED loads. The front-end circuit realizes self-adaptive constant voltage, and the dimming control circuit performs linear constant current drive control. Specifically, the front-end circuit provides output voltages to multiple branches of LED loads. The dimming control circuit obtains sampling signals corresponding to each branch of LED loads, and outputs feedback signals to the front-end circuit according to the sampling signals, and the front-end circuit adjusts and controls the output voltage according to the feedback signals. Due to the difference of each branch of LED loads, the output voltage of the front-end circuit needs to be output suitable for each branch of LED loads, and the logic combination control is carried out according to the sampling signals of each LED load, realizing the adaptive control of the output voltage of the front-end circuit, so as to match different LED light voltages, each branch of the LED loads work within a reasonable voltage range, so the system efficiency is high. In addition, for similar LED driving circuit including RGBCW five branches of LED loads, compared with the prior art, the circuit structure of the present application is greatly simplified and the system integration degree is higher.

Figure 6:
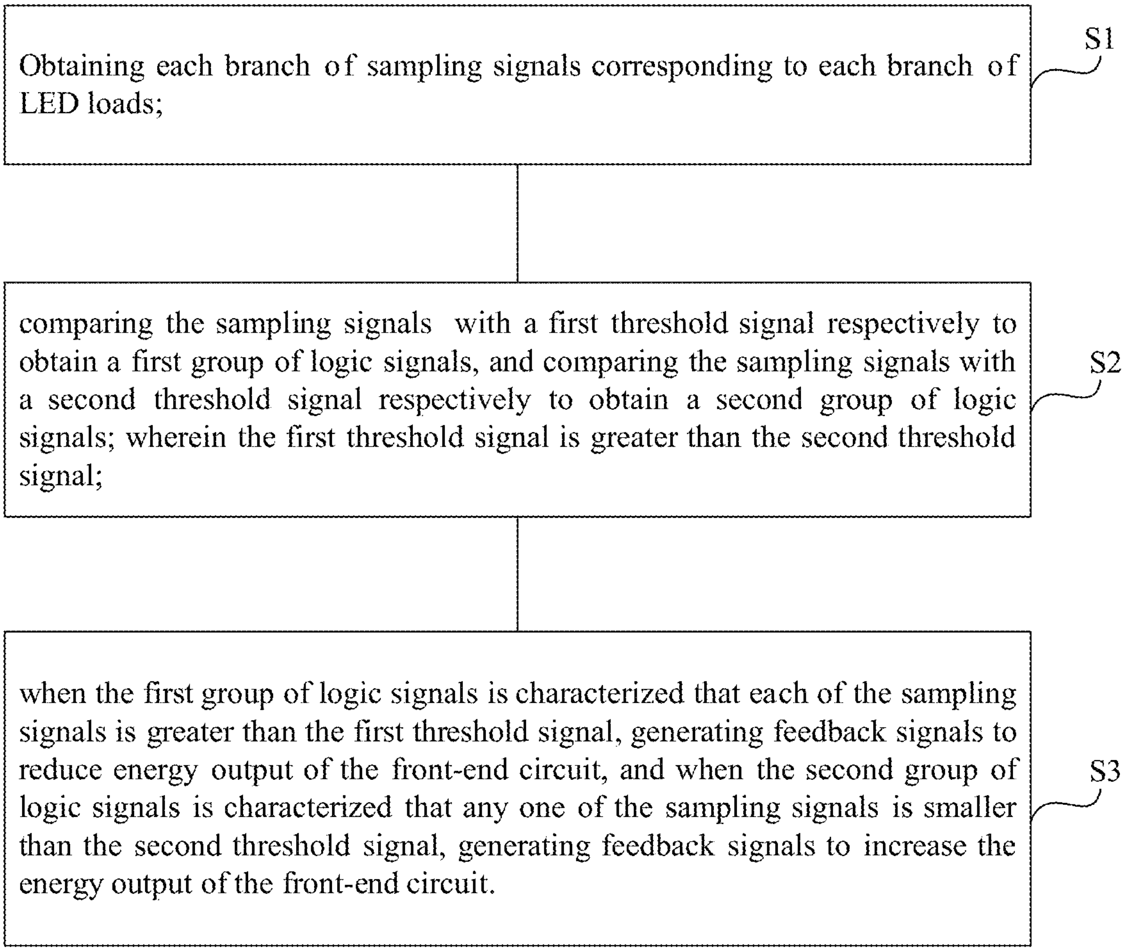
FIG. 6 shows a schematic diagram of steps of a dimming control method according to an embodiment of the present application.

An embodiment of the present application further is disclosed a dimming control method. The dimming control method is configured to drive multiple branches of light sources, the multiple branches of light sources comprising at least LED loads of two branches. As shown in FIG. 6, the dimming control method comprises:

Obtaining each branch of sampling signals corresponding to each branch of LED loads, comparing the sampling signals with a first threshold signal respectively to obtain a first group of logic signals, and comparing the sampling signals with a second threshold signal respectively to obtain a second group of logic signals; wherein the first threshold signal is greater than the second threshold signal; and when the first group of logic signals is characterized that each of the sampling signals is greater than the first threshold signal, generating feedback signals to reduce energy output of the front-end circuit, and when the second group of logic signals is characterized that any one of the sampling signals is smaller than the second threshold signal, generating feedback signals to increase the energy output of the front-end circuit.

In an embodiment of the present application, the feedback signals comprises a first combination signal, a second combination signal and a third combination signal, wherein the first combination signal is configured to control the front-end circuit to reduce the energy output, and the second combination signal is configured to control the front-end circuit to increase the energy output, and the third combination signal is configured to control the front-end circuit to maintain the energy output at a current state.

In another embodiment of the present application, the dimming control method further comprises: comparing the sampling signals with a third threshold signal respectively to obtain a third group of logic signals, wherein the third group of logic signals is the overvoltage threshold signal of an output voltage of the front-end circuit, and the third threshold signal is greater than the first threshold signal; when any one of the sampling signals is greater than the third threshold signal, the feedback signal generation circuit generates the feedback signals to control the front-end circuit to limit the energy output.

In an embodiment of the present application, the feedback signals further comprise a fourth combination signal, wherein the fourth combination signal is configured to control the front-end circuit to limit the energy output, and the logic control priority of the feedback signals is from high to low: the fourth combination signal, the second combination signal, the third combination signal, and the first combination signal.

In an embodiment of the present application, the dimming control method further comprises: comparing the sampling signals with a fourth threshold signal respectively to obtain a fourth group of logic signals, wherein the fourth threshold signal is smaller than the second threshold signal; when any one of the sampling signals is smaller than the fourth threshold signal, the feedback signal generation circuit generates the feedback signals to control the front-end circuit to limit the energy output.

In an embodiment of the present application, the dimming control method for driving multiple branches of LED loads, the multiple branches of LED loads comprise RGB lights and CW lights, wherein the RGB lights are dimming controlled by pulse width modulation dimming, and the CW lights are dimming controlled by analog dimming; When the pulse width modulation signal is at a first state, obtaining the sampling signals of the RGB lights respectively; obtaining the sampling signals of the CW lights at a real time; comparing the sampling signals of multiple branches of the LED loads with the first threshold signal respectively to obtain the first group of logic signals; and comparing the sampling signals of multiple branches of the LED loads with the second threshold signal to obtain the second group of logic signals.

The field technician should know, specification or drawings of the logic control of the "high level" and "low level", "setting" and "reset", "and gate" and "or gate", "non-inverting input" and "inverting input" logic control can exchange each other or change, such as by adjusting the subsequent logic control and the implementation and the implementation of the same function or purpose.

The description and application of the present application herein is illustrative and is not intended to limit the scope of the present application to the above embodiments. The description of effects or advantages involved in the specification may not be reflected in actual experimental cases due to the uncertainty of specific condition parameters or other factors, and the description of effects or advantages shall not be used to limit the scope of the application. Variations and alterations of embodiments disclosed herein are possible and the substitutions and equivalent components of embodiments are known to those ordinary technicians in the field. It should be clear to those skilled in the field that the application may be realized in other forms, structures, arrangements, proportions, and with other components, materials and components, without deviating from the spirit or essential characteristics of the application. Other variations and alterations may be made to the embodiments disclosed herein without leaving the scope and spirit of the application.

We claim:

1. A dimming control circuit, for driving multiple branches of light sources, the multiple branches of light sources comprising at least two branches of LED loads, the dimming control circuit comprising:

a logic signal generation circuit, having input terminals respectively coupled to each branch of LED loads to obtain each branch of sampling signals, configured to compare the sampling signals with a first threshold signal respectively to obtain a first group of logic signals, and configured to compare the sampling signals with a second threshold signal respectively to obtain a second group of logic signals; wherein the first threshold signal is greater than the second threshold signal; and a feedback signal generation circuit, having an input terminal coupled to an output terminal of the logic signal generation circuit, configured to generate feedback signals to reduce energy output by a front-end circuit when the first group of logic signals are characterized that each of the sampling signals is greater than the first threshold signal, and configured to generate feedback signals to increase the energy output by the front-end circuit when the second group of logic signals are characterized that any one of the sampling signals is smaller than the second threshold signal, and wherein the feedback signals comprise a first combination signal, a second combination signal and a third combination signal, and the first combination signal is configured to control the front-end circuit to reduce the energy output, and the second combination signal is configured to control the front-end circuit to increase the energy output, and the third combination signal is configured to control the front-end circuit to maintain the energy output at a current state; and wherein the feedback signal generation circuit comprises:

a first AND gate, having input terminals respectively coupled to each signal of the first group of logic signals, and having an output terminal to output the first combination signal;

a first OR gate, having input terminals respectively coupled to each signal of the second group of logic signals, and having an output terminal to output the second combination signal; and a first NOR gate, having a first input terminal coupled to the first combination signal, and having a second input terminal coupled to the second combination signal, and having an output terminal to output the third combination signal.

2. The dimming control circuit according to claim 1, wherein the multiple branches of light sources comprise at least a first branch of LED loads and a second branch of LED loads, and the logic signal generation circuit comprises:

a first branch of comparison circuit, comprising a first-one comparison circuit and a first-two comparison circuit, wherein a first terminal of the first-one comparison circuit is coupled to the first branch of LED loads, and a second terminal of the first-one comparison circuit is coupled to the first threshold signal; wherein a first terminal of the first-two comparison circuit is coupled to the second threshold signal, and a second terminal of the first-two comparison circuit is coupled to the first branch of LED loads; and a second branch of comparison circuit, comprising a second-one comparison circuit and a second-two comparison circuit, wherein a first terminal of the second-one comparison circuit is coupled to the second branch of LED loads, and a second terminal of the second-one comparison circuit is coupled to the first threshold signal; wherein a first terminal of the second-two comparison circuit is coupled to the second threshold signal, and a second terminal of the second-two comparison circuit is coupled to the second branch of LED loads.

3. The dimming control circuit according to claim 2, wherein the first branch of comparison circuit further comprises a first-one debounce circuit and a first-two debounce circuit, and an input terminal of the first-one debounce circuit is coupled to an output terminal of the first-one comparison circuit, and an input terminal of the first-two debounce circuit is coupled to an output terminal of the first-two comparison circuit; wherein the second branch of comparison circuit further comprises a second-one debounce circuit and a second-two debounce circuit, and an input terminal of the second-one debounce circuit is coupled to an output terminal of the second-one comparison circuit, and an input terminal of the first-two debounce circuit is coupled to an output terminal of the second-two comparison circuit.

4. The dimming control circuit according to claim 1, wherein the logic signal generation circuit is further configured to compare the samplings signal with a third threshold signal respectively to obtain a third group of logic signals, wherein the third group of logic signals is an overvoltage threshold signal of an output voltage of the front-end circuit, and the third threshold signal is greater than the first threshold signal; and wherein when any one of the sampling signals is greater than the third threshold signal, the feedback signal generation circuit generates the feedback signals to control the front-end circuit to limit the energy output.

5. The dimming control circuit according to claim 4, wherein the feedback signals further comprise a fourth combination signal, and the fourth combination signal is configured to control the front-end circuit to limit the energy output, and the logic control priority of the feedback signals is from high to low: the fourth combination signal, the second combination signal, the third combination signal, and the first combination signal.

6. The dimming control circuit according to claim 5, wherein the feedback signal generation circuit comprises:

a first AND gate, having input terminals respectively coupled to each signal of the first group of logic signals;

a first NOT gate, having an input terminal coupled to an output terminal of the first AND gate;

a second NOR gate, having a first input terminal coupled to an output of the first NOT gate, and having a second input terminal coupled to the fourth combination signal, and having an output terminal to output the first combination signal;

a first OR gate, having input terminals respectively coupled to each signal of the second group of logic signals;

a second NOT gate, having an input terminal coupled to an output terminal of the first OR gate;

a third NOR gate, having a first input terminal coupled to an output terminal of the second NOT gate, and having a second input terminal coupled to the fourth combination signal, and having an output terminal to output the second combination signal;

a second OR gate, having input terminals respectively coupled to each signal of the third group of logic signals;

a fourth NOR gate, having a first input terminal coupled to an output terminal of the second OR gate, and having a second input terminal coupled to an output terminal of the first AND gate;

a flip-flop circuit, having a set terminal coupled to an output terminal of the second OR gate, and having a reset terminal coupled to an output terminal of the fourth NOR gate, and having an output terminal to output the fourth combination signal;

a first NOR gate, having a first input terminal coupled to the first combination signal, and having a second input terminal coupled to the second combination signal, and having a third input terminal coupled to the fourth combination signal, and having an output terminal coupled to the third combination signal.

7. The dimming control circuit according to claim 4, wherein the logic signal generation circuit is further configured to compare the sampling signals with a fourth threshold signal respectively to obtain a fourth group of logic signals, and the fourth threshold signal is smaller than the second threshold signal; when any one of the sampling signals is smaller than the fourth threshold signal, the feedback signal generation circuit generates the feedback signals to control the front-end circuit to limit the energy output.

8. The dimming control circuit according to claim 1, wherein the dimming control circuit is configured to drive multiple branches of LED loads, and the multiple branches of LED loads comprise RGB lights and CW lights, and the RGB lights are dimming controlled by pulse width modulation dimming, and the CW lights are dimming controlled by analog dimming; When the pulse width modulation signal is at a first state, the logic signal generation circuit obtains each branch of sampling signals of the RGB lights respectively; the logic signal generation circuit obtains each branch of sampling signals of the CW lights at a real time; the logic signal generation circuit compares the sampling signals of the multiple branches of LED loads with the first threshold signal respectively to obtain the first group of logic signals; and the logic signal generation circuit compares the sampling signals of the multiple branches of LED loads with the second threshold signal respectively to obtain the second group of logic signals.

9. A LED driver circuit, comprising a front-end circuit and the dimming control circuit as claimed in claim 8, the front-end circuit comprising a voltage conversion circuit, and the voltage conversion circuit configured to convert an input voltage to a voltage suitable for each of LED loads.

10. A LED driver circuit, comprising a front-end circuit and the dimming control circuit as claimed in claim 1, the front-end circuit comprising a voltage conversion circuit, and the voltage conversion circuit configured to convert an input voltage to a voltage suitable for each of LED loads.

11. A dimming control method, for driving multiple branches of light sources, the multiple branches of light sources comprising at least two branches of LED loads, the dimming control method comprising:

obtaining each branch of sampling signals corresponding to each branch of LED loads, comparing the sampling signals with a first threshold signal respectively to obtain a first group of logic signals, and comparing the sampling signals with a second threshold signal respectively to obtain a second group of logic signals;

wherein the first threshold signal is greater than the second threshold signal; and when the first group of logic signals is characterized in that each of the sampling signals is greater than the first threshold signal, generating feedback signals to reduce energy output of the front-end circuit, and when the second group of logic signals is characterized that any one of the sampling signals is smaller than the second threshold signal, generating feedback signals to increase the energy output of the front-end circuit; and wherein the dimming control method further comprises: comparing the sampling signals with a third threshold signal respectively to obtain a third group of logic signals, and the third group of logic signals is an overvoltage threshold signal of an output voltage of the front-end circuit, and the third threshold signal is greater than the first threshold signal; when any one of the sampling signals is greater than the third threshold signal, the feedback signal generation circuit generates the feedback signals to control the front-end circuit to limit the energy output.

12. The dimming control circuit according to claim 11, wherein the feedback signals comprise a first combination signal, a second combination signal and a third combination signal, and the first combination signal is configured to control the front-end circuit to reduce the energy output, and the second combination signal is configured to control the front-end circuit to increase the energy output, and the third combination signal is configured to control the front-end circuit to maintain the energy output at a current state.

13. The dimming control circuit according to claim 12, wherein the dimming control method further comprises: comparing the sampling signals with a fourth threshold signal respectively to obtain a fourth group of logic signals, and the fourth threshold signal is smaller than the second threshold signal; when any one of the sampling signals is smaller than the fourth threshold signal, the feedback signal generation circuit generates the feedback signals to control the front-end circuit to limit the energy output.

14. The dimming control circuit according to claim 11, wherein the feedback signals further comprise a fourth combination signal, and the fourth combination signal is configured to control the front-end circuit to limit the energy output, and the logic control priority of the feedback signals is from high to low: the fourth combination signal, the second combination signal, the third combination signal, and the first combination signal.

15. The dimming control circuit according to claim 11, wherein the dimming control method is configured to drive multiple branches of LED loads, and the multiple branches of LED loads comprise RGB lights and CW lights, and the RGB lights are dimming controlled by pulse width modulation dimming, and the CW lights are dimming controlled by analog dimming; When the pulse width modulation signal is at a first state, obtaining each branch of the sampling signals of the RGB lights respectively; obtaining each branch of the sampling signals of the CW lights at a real time; comparing the sampling signals of the multiple branches of LED loads with the first threshold signal respectively to obtain the first group of logic signals; and comparing the sampling signals of the multiple branches of LED loads with the second threshold signal to obtain the second group of logic signals.

* * * * *